(12) United States Patent
Sennett et al.

(10) Patent No.: US 8,786,434 B2
(45) Date of Patent: Jul. 22, 2014

(54) SYSTEMS AND METHODS FOR CONTROLLING A SECRUITY SYSTEM VIA A MOBILE DEVICE

(75) Inventors: DeWayne Allan Sennett, Redmond, WA (US); Brian Kevin Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 595 days.

(21) Appl. No.: 12/056,742

(22) Filed: Mar. 27, 2008

(65) Prior Publication Data

US 2009/0243834 A1    Oct. 1, 2009

(51) Int. Cl.
*G08B 13/00* (2006.01)

(52) U.S. Cl.
USPC ............... 340/541; 340/539.1; 340/539.18; 340/539.17; 340/5.1; 340/5.2

(58) Field of Classification Search
USPC ......................................................... 340/541
See application file for complete search history.

(56) References Cited

U.S. PATENT DOCUMENTS

| | | | | |
|---|---|---|---|---|
| 6,271,752 B1 * | 8/2001 | Vaios | ............................ | 340/541 |
| 6,529,137 B1 * | 3/2003 | Roe | ............................ | 340/691.1 |
| 6,661,340 B1 * | 12/2003 | Saylor et al. | .................. | 340/517 |
| 6,759,957 B2 * | 7/2004 | Murakami et al. | ............ | 340/541 |
| 6,975,220 B1 * | 12/2005 | Foodman et al. | ............. | 340/531 |
| 2002/0026462 A1 * | 2/2002 | Shotton et al. | ................ | 707/523 |
| 2003/0025599 A1 * | 2/2003 | Monroe | ........................ | 340/531 |
| 2003/0128113 A1 * | 7/2003 | Chang et al. | .................. | 340/506 |
| 2007/0085676 A1 * | 4/2007 | Lee et al. | .................. | 340/539.18 |
| 2007/0279209 A1 * | 12/2007 | Kogan et al. | .................. | 340/506 |
| 2008/0129484 A1 * | 6/2008 | Dahl et al. | .................... | 340/501 |
| 2008/0191861 A1 * | 8/2008 | Mason et al. | ................. | 340/506 |
| 2008/0197999 A1 * | 8/2008 | Henderson | .................... | 340/521 |
| 2009/0174772 A1 * | 7/2009 | Tapp et al. | .................... | 348/143 |

* cited by examiner

*Primary Examiner* — Curtis King
(74) *Attorney, Agent, or Firm* — Baker & Hostetler LLP (57) ABSTRACT

A subscriber may interact with a mobile device to control a security system. For example, a panel interface that may correspond to a control panel of the security system may be provided to the mobile device. The subscriber may then interact with the panel interface to control the security system. Additionally, an activation indication from a component of the security system may be provided to the mobile device via an activation interface. The activation interface may include information such as an alarm type, zone, or the like that may be associated with the activation indication.

11 Claims, 9 Drawing Sheets

SYSTEMS AND METHODS FOR CONTROLLING A SECRUITY SYSTEM VIA A MOBILE DEVICE

BACKGROUND

Typically, when a security system such as a home security system may be activated, notification of the activation may be provided to a security system provider. The security system provider may then contact the owner of the security system to provide notification of the alarm being activated. Upon receiving such notification, the owner may determine whether the security system provider should deactivate the security system, because, for example, the activation was a false alarm, or whether the security system provider should dispatch, for example, police. Unfortunately, the owner may not have proper information to determine whether to deactivate or dispatch police when the security system may be activated. Additionally, the owner may wish to control the security system remotely, but may have to rely upon the security system provider or analog, non-interactive technologies to provide such control.

SUMMARY

A subscriber may control and access a security system via, for example, a mobile device. In an example embodiment, the mobile device may render a panel interface that may include a panel option. The subscriber may then interact with the panel interface to select the panel option. The mobile device may receive the selected panel option and may provide the selected panel option to the security system such that the security system may perform a function corresponding to the selected panel option. The mobile device may also notify the subscriber of an activation of the security system. For example, the mobile device may receive an activation indication associated with a component of the security system and may output the activation indication to the subscriber via, for example, an activation interface.

According another embodiment, a network provider of the mobile device may provide notification of the activation of the security system. For example, the network provider may include a system that may receive an activation indication associated with a component of the security system. Upon receipt of the activation indication, the system may determine an alarm type associated with the activation indication. The system may then provide an activation interface that may include activation information corresponding to the alarm type determined.

BRIEF DESCRIPTION OF THE DRAWINGS

The foregoing and other objects, aspects and advantages of accessing and controlling a security system will be better understood from the following detailed description with reference to the drawings.

DETAILED DESCRIPTION OF ILLUSTRATIVE EMBODIMENTS

As will be described herein, a security system such as a home security system may be in communication with a mobile device registered to a subscriber such that the subscriber may access and control the security system via, for example, the mobile device. In an example embodiment, a panel interface may be provided to the mobile device. For example, the panel interface may be a virtual display of the control panel or keypad provided with the security system. The subscriber may interact with the panel interface via the mobile device to control the security system. According to another example embodiment, if the security system may be activated, an activation indication may be provided to the mobile device. The mobile device may then render an activation interface. The activation interface may issue the activation indication to the subscriber. According to one embodiment, the activation interface may also provide information such as the activation type (e.g. the type of alarm activated), the zone activated (e.g. the room where the security system may have been activated), or the like. The activation interface may also provide an option or a link to a zone interface. The zone interface may provide, for example, a real-time display via a video device located in the zone activated. Additionally, if multiple subscribers may be associated with the security system, each device associated with the subscribers may be provided with the activation indications and interfaces.

Figure 1A:
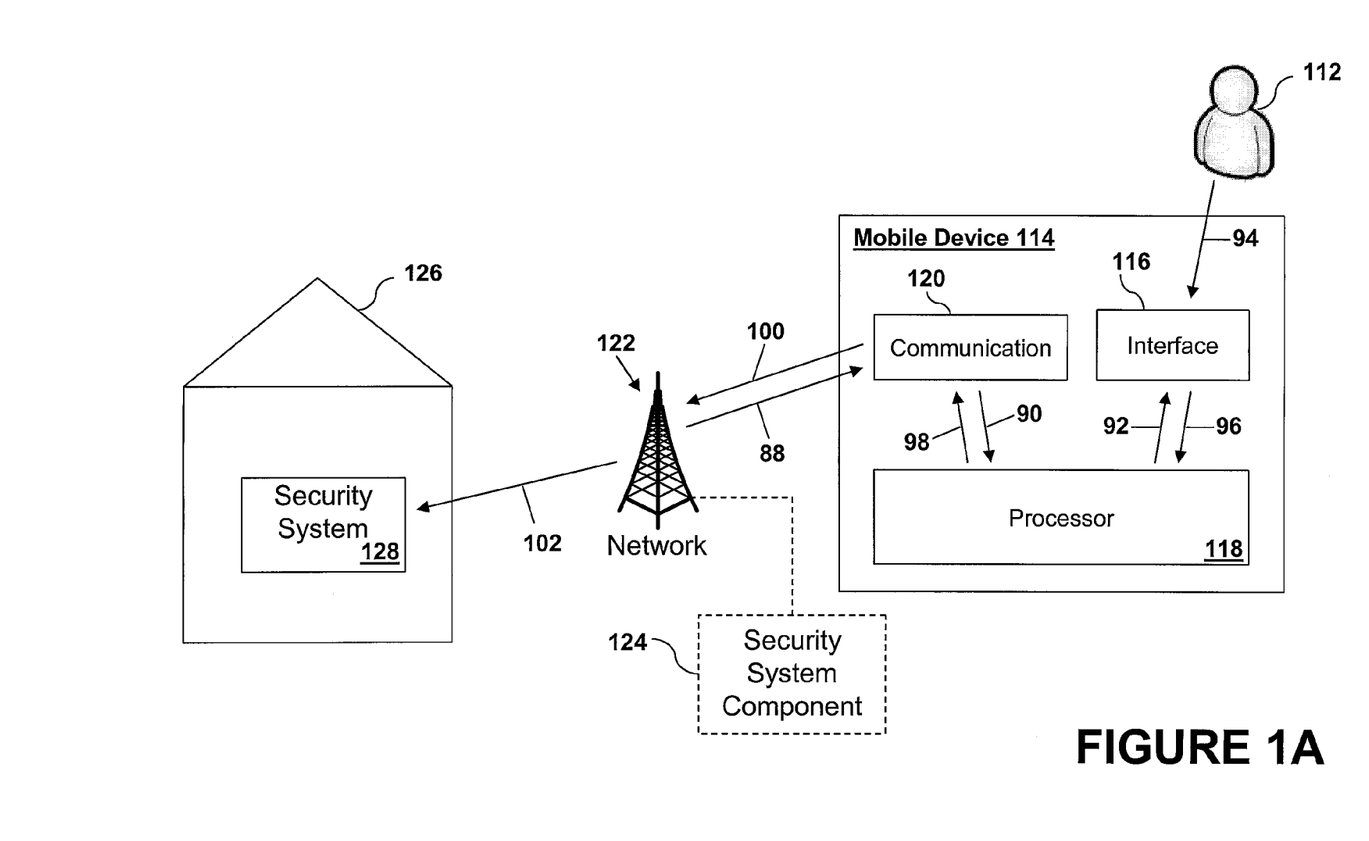
FIGS. 1A and 1B depict an example system and example processes for controlling a security system via a mobile and providing notification of the security system being activated to a mobile device.
Figure 1B:
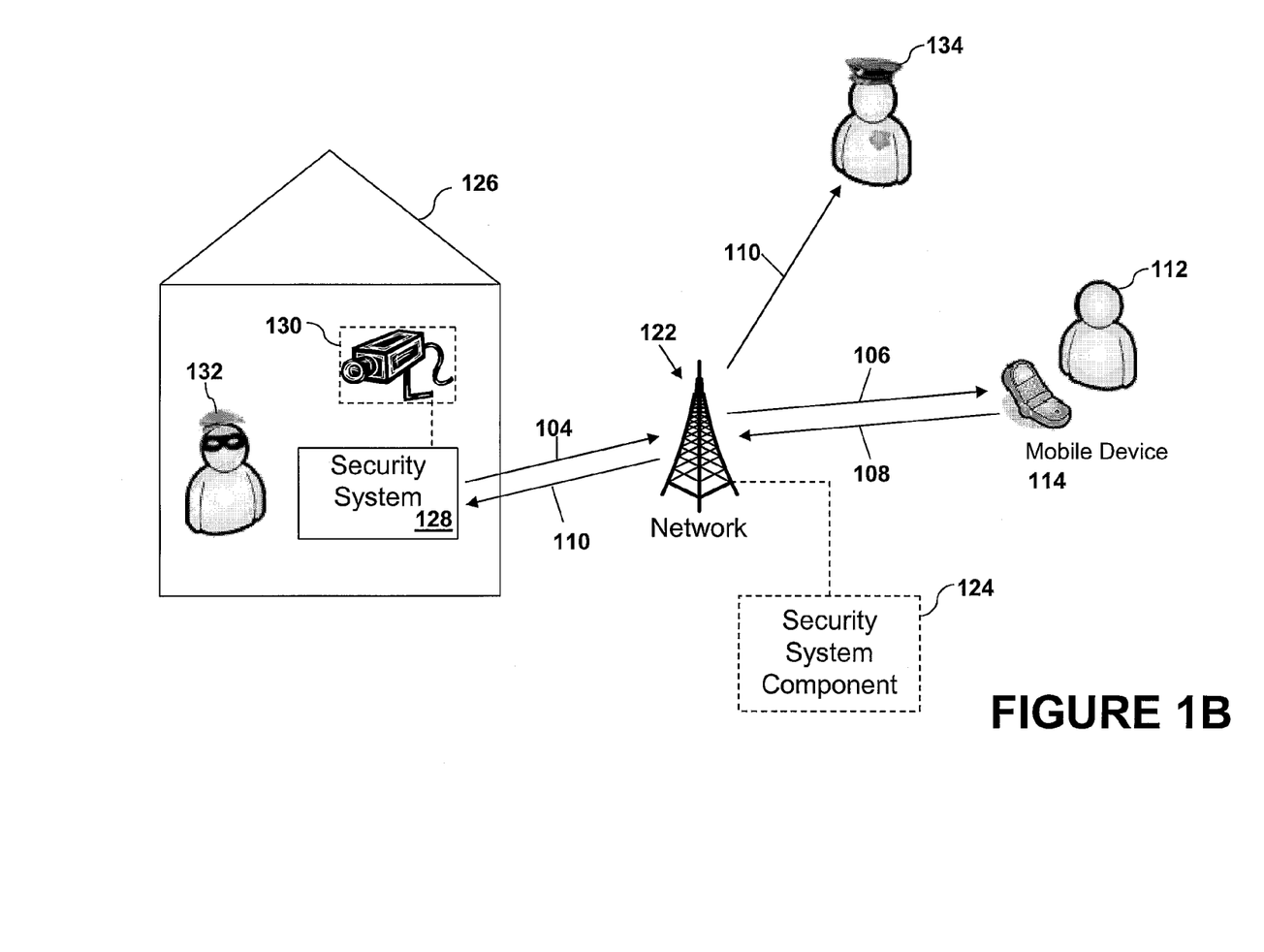

FIGS. 1A and 1B depict an example system and example processes for controlling a security system via a mobile and providing notification of the security system being activated to a mobile device. As shown in FIG. 1A, a mobile device 114 may be in communication with a security system 128 via a network 122 such that a subscriber 112 of the mobile device 114 may interact with the mobile device 114 to control the security system 128. The network 122 may be any type of communication network such as the internet, a Local Area Network (LAN), a Wide Area Network (WAN), a cellular telephone network, or the like. For example, the network 122 may include the example networks described below in FIGS. 6-8 such as Global System for Mobile communication ("GSM"), General Packet Radio Service ("GPRS"), Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), WiFi, WiMAX, or the like. The network 122 may be operated by a network provider such as an internet service provider, a cellular telephone provider, or the like. According to an example embodiment, the network provider may offer bandwidth and/or network access to subscribers thereof to enable communication between the subscribers and other devices such as cellular phones, PDAs, PCs, Voice over Internet Protocol devices, analog telephone devices, or the like.

At 88, the network 122 may provide a panel indication or a panel interface to the mobile device 114. The panel indication may include an identifier such as a model number, serial number, or the like of a security system of the subscriber. The panel interface may include a web page, java interface, flash interface, or the like. The mobile device 114 may be representative of any appropriate type of device that may be utilized to render interfaces associated with a security system and/or receive commands from the subscriber via the interfaces to control the security system. According to example embodiments, the mobile device 114 may be any appropriate mobile device, such as, for example, a portable device, a variety of computing devices including (a) a portable media player, e.g., a portable music player, such as an MP3 player, a walkmans, etc., (b) a portable computing device, such as a laptop, a personal digital assistant ("PDA"), a portable phone, such as a cell phone of the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

The mobile device 114 may include hardware components such as a processor, a graphics card, a storage component, a memory component, an antenna, a communication component, an interface such as a speaker, display, or the like. The mobile device 114 may also include software components such as an operating system that may control the hardware components.

In one embodiment, the mobile device 114 may include an interface component 116, a processor 118, and a communication component 120. The communication component 120 may include an antenna, communication port, or the like that may be used to establish a communication link with the network 122. As shown in FIG. 1A, the network 122 may include a security system component 124 that may provide the panel indication or the panel interface to the mobile device 114 using the communication link established between the communication component 120 and the network 122, which will be described in more detail below.

The communication component 120 of the mobile device 114 may provide the panel indication or the panel interface to a processor 118 at 90. The processor 118 may include any appropriate type of processor such as a single processor, multiple processors that may be distributed or centrally located, or the like. For example, the processor 118 may be a mobile communications device processor, a computer processor, a handheld processor, or the like. The processor 118 may also include any other suitable hardware such as cache, Random Access Memory, storage devices, or the like and/or software. In one embodiment, the processor 118 may analyze the panel indication and may provide a panel interface indication to the interface component 116. For example, the processor 118 may receive the panel indication and may determine the appropriate control panel corresponding thereto.

At 92, the processor 118 may provide the panel interface indication or the panel interface to the interface component 116 of the mobile device 114. The interface component 116 may display the panel interface provided by the security system component 124 to the subscriber via the interface component 116. Alternatively, the interface component 116 may render the panel interface based on the panel interface indication. In one embodiment, the interface component 116 may render the panel interface in, for example, a visual format such as a web page, flash interface, java interface, or the like, an audio format, and/or any other suitable format.

The subscriber 112 may interact with the panel interface to control the security system 128. For example, at 94, the subscriber 112 may select a panel option such as activate the security system, deactivate the security system, or the like that may be provided via the panel interface rendered by the interface component 116 of the mobile device 114. The panel option may correspond to a command that may control one or more behaviors of the security system. For example, the interface component 116 may include a keypad, a touch screen, or the like that may accept input from the subscriber 112.

The interface component 116 may provide the panel option received from the keypad, the touch screen, or the like to the processor 118 at 96. The processor 118 may then provide the option to the communication component 120, at 98, such that the communication component 120 may provide the panel option to the network 122, at 100, using the communication link established between the communication component 120 and the network 122.

The network 122 may provide a control indication associated with the panel option selected by the subscriber to the security system 128 at 102 such the control indication may cause the security system 128 to behave in a manner corresponding to the panel option selected by the subscriber 112. For example, at 100, the security system component 124 may receive the panel option selected by the subscriber 112 interacting with the panel interfaced provided thereby. Upon receipt of the panel option, the security system component 124 may determine the control indication that may correspond to the panel option received from the subscriber 112. For example, the security system component 124 may store a list of control indications associated with each panel option provided via the panel interface. The security system component 124 may compare the command received, at 100, with the list of control selections such that the security system component 124 may select the appropriate control indication and provide that control indication to the security system 128, at 102, which will be described in more detail below.

As shown in FIG. 1B, the security system 128 may be activated such that an activation indication may be provided to the network 122 at 104. For example, a fire detector component, a carbon monoxide component, a burglar component, or the like that may be part of the security system 128 may be activated. As shown in FIG. 1B, in one embodiment, an intruder 132 may activate a burglar component of the security system 128. Upon activation, the security system 128 may provide an activation indication to the network 122 at 104. According to an example embodiment, the activation indication may include information associated with the component such as the fire detector component, carbon monoxide component, burglar component, or the like activated. The activation indication may also include video and/or audio information. For example, the security system 128 may include a video device 130. The video device 130 may be a camera, a video camera, or the like that may receive real-time video and/or audio information for one or more zones such as rooms in the building 126 that the security system 128 may be integrated therein. The activation indication may include the video and/or audio information from the video device 130.

The network 122 may provide the activation indication to the mobile device 114 at 106. In one embodiment, the mobile device 114 may analyze the activation indication and may provide an activation interface associated with the activation indication. For example, the communication component 120, shown in FIG. 1A, may receive the activation indication from the network 122 at 106. The communication component 120 may provide the activation indication to the processor 118. The processor 118 may analyze the activation indication and may provide an interface indication to the interface component 116 such that the interface component 116 may render an activation interface associated with the received activation indication. The subscriber 112 may then view information associated with the component of the security system 128 via the activation interface. For example, the activation interface may include an indication of the alarm type, an indication on the zone such as the room that activated the security system 128, the video and/or audio information associated with the video device 130, or the like.

Alternatively, the network 122 may analyze the activation indication received at 104 and may provide an activation interface associated with the activation indication to the mobile device 114 at 106. For example, the network 122 may include the security system component 124. The security system component 124 may determine the activation interface to provide to the mobile device 114, at 106, based on the activation indication received at 104. For example, the security system component 124 may store interface information such as the alarm type, zone activated, or the like that may be provided via the activation interface. The security system component 124 may determine the interface information to provide via the activation interface, which will be described in more detail below.

The subscriber 112 may interact with the activation interface such that the subscriber 112 may, for example, deactivate the security system 128, dispatch a protection entity 134 such as a law enforcement office, fireman, or the like to the building 126, or the like. For example, the subscriber 112 may select an activation interface option such as a deactivation option, a dispatch option, or the like via the activation interface.

The activation interface option may be provided to the security system 128 to the network 122 at 108. In one embodiment, the security system component 124 may analyze the activation interface option received at 108. If the activation option corresponds to the deactivation option, the network 122 may provide a deactivation indication to the security system 128, at 110, such that the security system 128 may be deactivated. If the activation option corresponds to the dispatch option, the network 122 may provide a dispatch indication to the protection entity 134, at 110, such that the protection entity 134 may be informed of the activation of the security system 128. The protection entity may then proceed to investigate the building 126.

Figure 2:
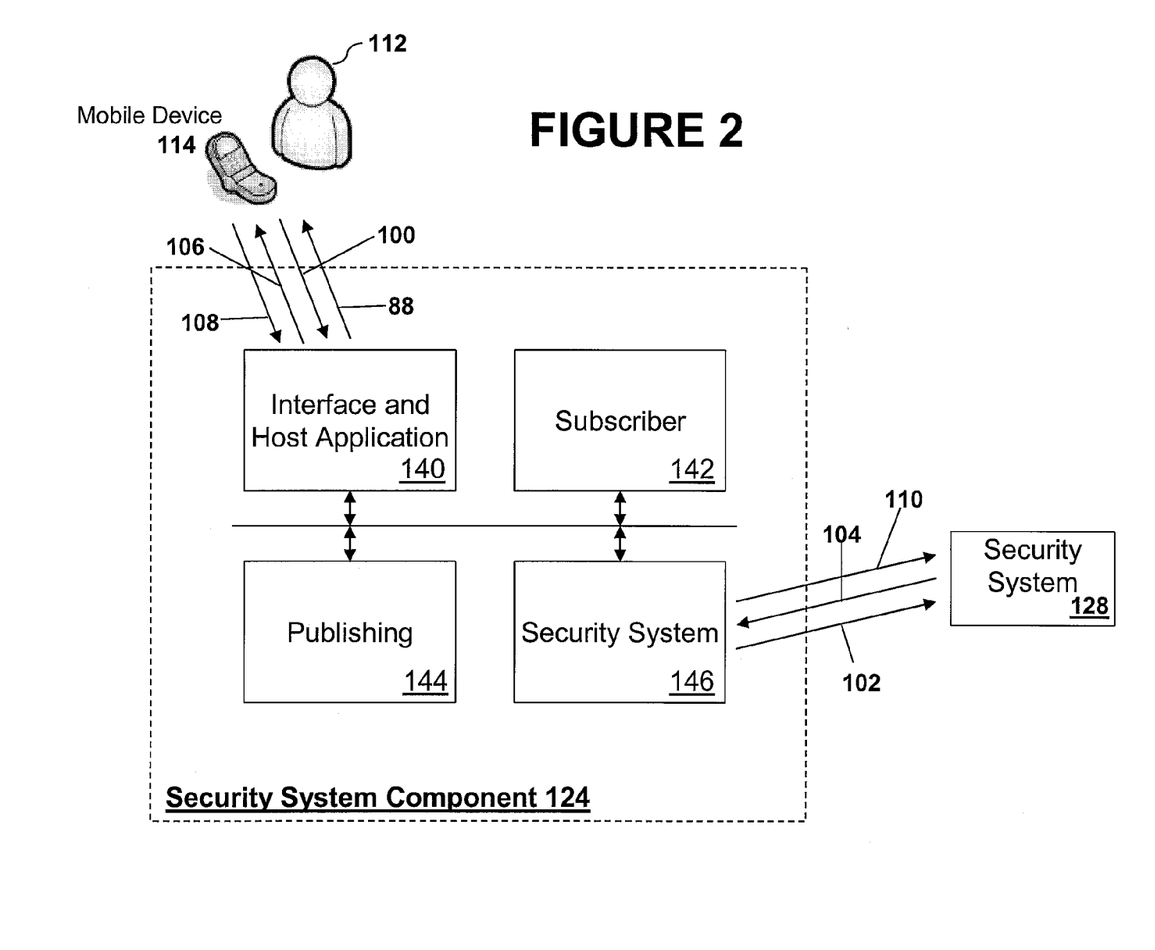
FIG. 2 depicts an example embodiment of a security system component for accessing and controlling a security system.

FIG. 2 depicts an example embodiment of a security system component for accessing and controlling a security system. The security system component 124 may be implemented as an independent component that may be in operative communication with other components of the wireless broadcast network such as the MSC, the HLR, or the like described below in FIGS. 6-8. Alternatively, the security system component 124 may be implemented as a component within the MSC, the HLR, or the like as described below in FIGS. 6-8. For example, the alert and configuration system may be a feature added to HLR 774 depicted in FIG. 7. Additionally, the functionality of the security system component 124 may be performed by any suitable hardware and/or software or any combination thereof within HLR 774, for example.

Thus, according to example embodiments, the security system component 124 may be implemented using a variety of techniques and hardware components including, but not limited to, servers, databases, microchips, storage devices, processors, or programmed modules. Furthermore, as described above, the security system component 124 may be implemented as an independent component of the network 122, as a separate component within existing components in the network 122, and/or using existing components within the network 122.

The security system component 124 may also include any combination of systems and sub-systems. According to one embodiment, the security system component 124 may include an interface and host application 140, a subscriber module 142, a publishing module 144, and a security system module 146. The interface and host application 140, subscriber module 142, publishing module 144, and security system module 146 may be in operative communication with each other via, for example a bus or any other subsystem that may transfer data between components.

The interface and host application 140 may interface with the mobile device 114 to provide communication between, for example, the mobile device 114 and various components and features of the security system component. The interface and host application 140 may include software components such as operating systems, Web-based management applications, or the like such that the interface and host application may present an interface such as a web page, flash interface, java interface, or the like to the subscriber such as subscriber 112 via the mobile device 114. For example, interface and host application 140 may provide one or more interfaces such as a panel interface that may be provided at 88, an activation interface that may be provided at 106, or the like to the mobile device 114. The interface and host application 140 may also handle the submission of panel interface options at 100, activation interface options at 108, or the like.

The subscriber module 142 may include any combination of hardware components such as processors, databases, storage drives, registers, cache, RAM memory chips, data buses, or the like and/or software components such that the subscriber module 142 may provide a mechanism for storing a security system identifier such as a model number, serial number, or the like that may be associated with the security system 128 of the subscriber 112. According to one embodiment, the security system 128 identifier may used to determine a panel interface, activation interface, or the like to provide to the mobile device 114 via the interface and host application 140.

The security system component 124 may also include the publishing module 144. The publishing module 144 may include any combination of hardware components such as processors, databases, storage drives, registers, cache, RAM memory chips, data buses, or the like and/or software components. Processes internal to the security system component 124 may use the publishing module 144 to manipulate, display, or manage data. The publishing module 144 may be used to receive and deliver data for the panel interface, activation interface, or the like including alert message types, or the like in a variety of ways including, but not limited to, Hypertext Transfer Protocol (HTTP) and/or Secure Hypertext Transfer Protocol (HTTP/S) for simple Web-based access, Simple Main Transfer Protocol (SMTP) for e-mail notifications, Web Services/Simple Object Access Protocol (SOAP) for a programmatic way to access the data, and Sharepoint for online review and collaboration of data. For example, according to one embodiment, the publishing module 144 may generate interfaces such as web pages, java interfaces, flash interfaces, or the like that may be provided to the subscriber using the mobile device 114 via HTTP through interface and host application 140. The subscriber 112 may then interact with the interfaces to access and control the security system 128.

According to one embodiment, the security system component 124 may further include the security system module 146. The security system module 146 may include hardware such as processors, RAM memory chips, storage, or the like and/or software such that the security system module 146 may interface with the security system 128 to receive an activation indication at 104, and provide a control indication such as a deactivation at 102 and 110, for example. The security system module 146 may also provide communication between, for example, the security system 128 and various components and features of the security system component 124. According to one embodiment, the security system module 146 may be used to determine the control indication that may be provided to the security system at 102. The security system module 146 may also interface with the publishing module 144 and the subscriber module 142 to provide an activation interface, a panel interface, or the like to the mobile device 114.

Figure 3:
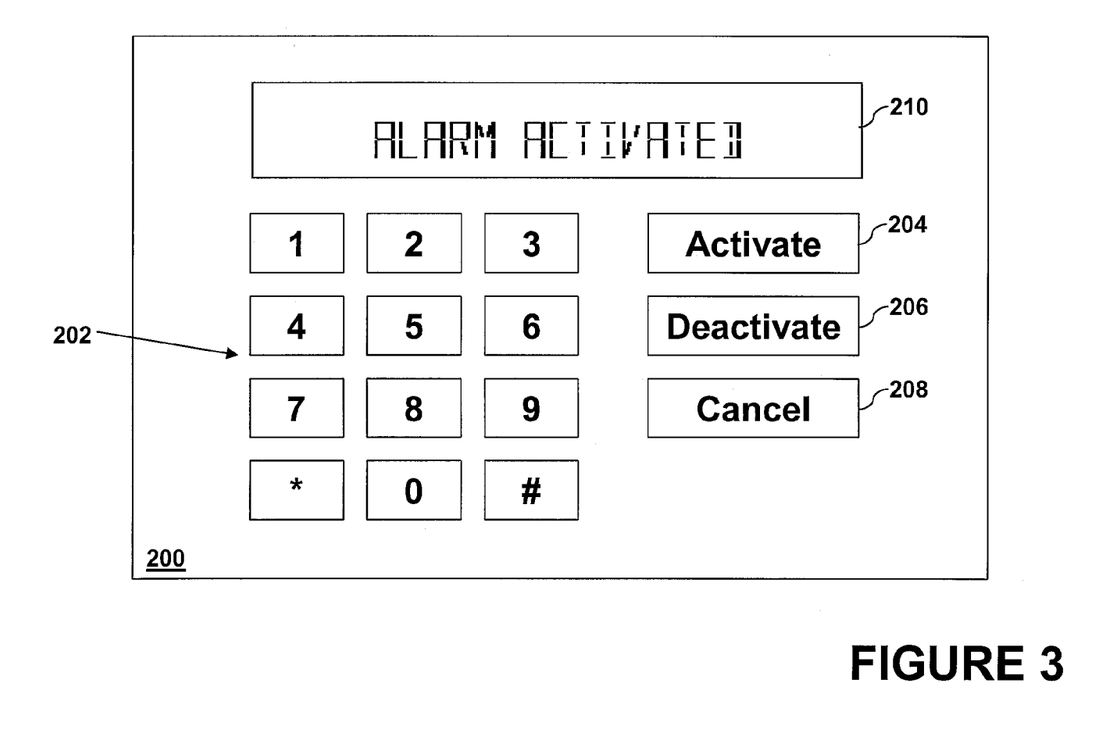
FIG. 3 depicts an example embodiment of a panel interface that may be provided to a subscriber via the mobile device.

FIG. 3 depicts an example embodiment of a panel interface that may be provided to a subscriber via the mobile device. As shown in FIG. 3, the interface 200 may include a keypad interface 202. The subscriber may interact with the keypad interface 202 to enter a security code, a password, or the like that may be used to activate and/or deactivate the security system. According to an example embodiment, the panel interface 200 may be generated by the publishing module 144 and may be provided to the mobile device of the subscriber via the interface and host application 140 of the security system component 124, shown in FIG. 2.

The panel interface 200 may also include an activate option 204, a deactivate option 206, and a cancel option 208. The subscriber may select the activate option 204 to activate or turn on the security system via the mobile device. The subscriber may also select the deactivate option to deactivate the security system via the mobile device.

In one embodiment, to select the activate option 204 and/or the deactivate option 206, the subscriber may interact with the keypad interface 202 to provide a security code, a password, or the like. Upon entering the security code, password, or the like, the subscriber may select the activate option 204 and/or the deactivate option 206. The selected option may then be provided to the network 122 at 100, shown in FIG. 1A. The network 122 may use the selected option to determine a control indication to provide at 102 to control the security system.

The panel interface 200 may further include a status panel 210. The status panel 210 may provide information that may indicate the status of the security system. For example, the status panel 210 may provide status indicators such as activated, deactivated, or the like corresponding to the current status of the security system.

Figure 4:
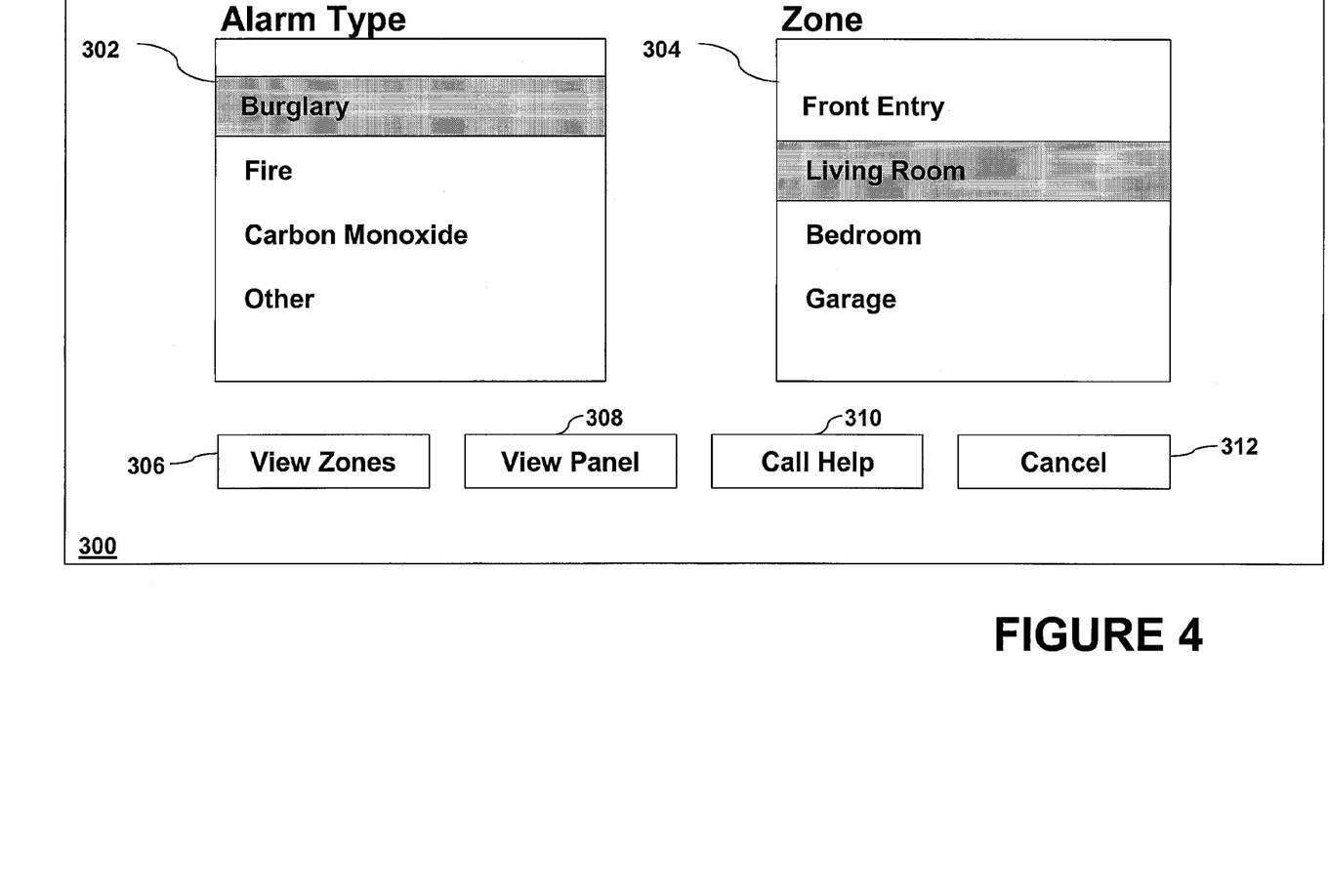
FIG. 4 depicts an example embodiment of an activation interface that may be provided to a subscriber via a mobile device.

FIG. 4 depicts an example embodiment of an activation interface that may be provided to a subscriber via a mobile device. The activation interface 300 may include an alarm type block 302 and a zone type block 304. The alarm type block 302 may include a list of the alarm types such as burglary, fire, carbon monoxide, other, or the like that may be activated by a component of the security system. The zone type block 304 may include a list of zones or rooms that may be protected by a component of the security system. In one embodiment, an alarm type in the alarm type block 302 and a zone in the zone block 304 may be highlighted to provide the type and location of the component of the security system activated.

The activation interface 300 may further include a view zone option 306, a view panel option 308, a call help option 310, and a cancel option 312. The view zone option 306 may be selected by the subscriber such that the subscriber may be directed to a zone interface, which will be described in more detail below. The view panel option may be selected by the subscriber such that the subscriber may be directed to a panel interface such as the panel interface 200 shown in FIG. 3. The subscriber may also select the call help option 310. The call help option 310 may provide an indication of the call help option to the network 122 at 108, shown in FIG. 1B, such that the network 122 may provide a dispatch indication to the protection entity 134 at 110.

Figure 5:
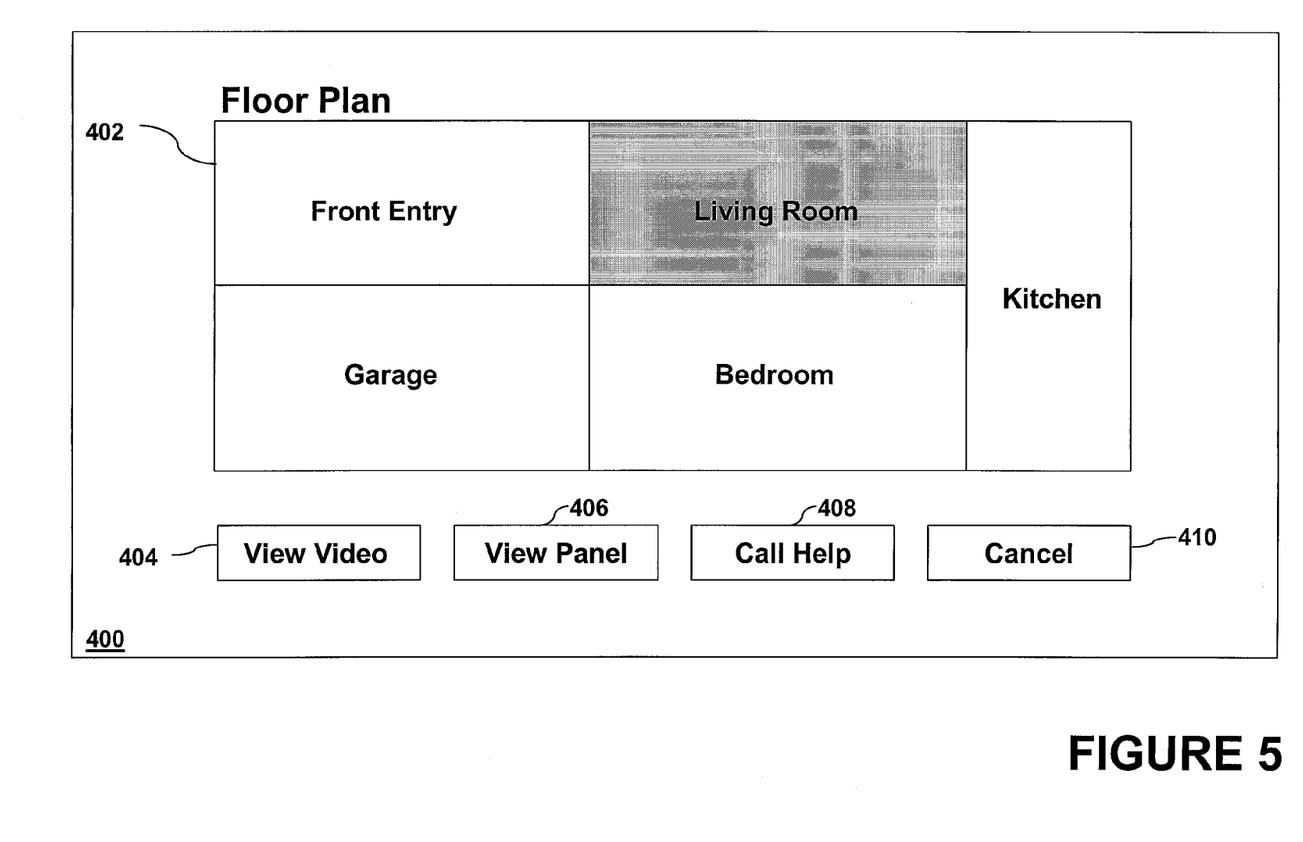
FIG. 5 depicts an example embodiment of a zone interface that may be provided to a subscriber via a mobile device.

FIG. 5 depicts an example embodiment of a zone interface that may be provided to a subscriber via a mobile device. The zone interface 400 may include a floor plan block 402 of the building such as the building 126 that includes the security system. As shown in FIG. 5, the zone that may include the component of the security system activated may be highlighted.

The zone interface 400 may further include a view video option 404, a view panel option 406, a call help option 408, and a cancel option 410. The subscriber may select the view video option 404 to direct the subscriber to real-time video and/or audio information of the zone activated. For example, if the security system includes a video device, the subscriber may select the view video option 404 to receive real-time feed from the video device.

The subscriber may also select the view panel option 406 such that the subscriber may be directed to a panel interface such as the panel interface 200 shown in FIG. 3. The subscriber may also select the call help option 408. The call help option 408 may provide an indication of the call help option to the network 122 at 108, shown in FIG. 1B, such that the network 122 may provide a dispatch indication to the protection entity 134 at 110.

The following description sets forth some exemplary telephony radio networks and non-limiting operating environments for controlling a security system and notifying a subscriber of the security system being activated. The below-described operating environments should be considered non-exhaustive, however, and thus the below-described network architectures merely shows how controlling a security system and notifying a subscriber of the security system being activated may be incorporated into existing network structures and architectures. It may be appreciated, however, that controlling a security system and notifying a subscriber of the security system being activated may be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art may appreciate, the exemplary GSM/GPRS environment and services described herein also may be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques described herein may be applied independently of the method for data transport, and do not depend on any particular network architecture, or underlying protocols.

Figure 6:
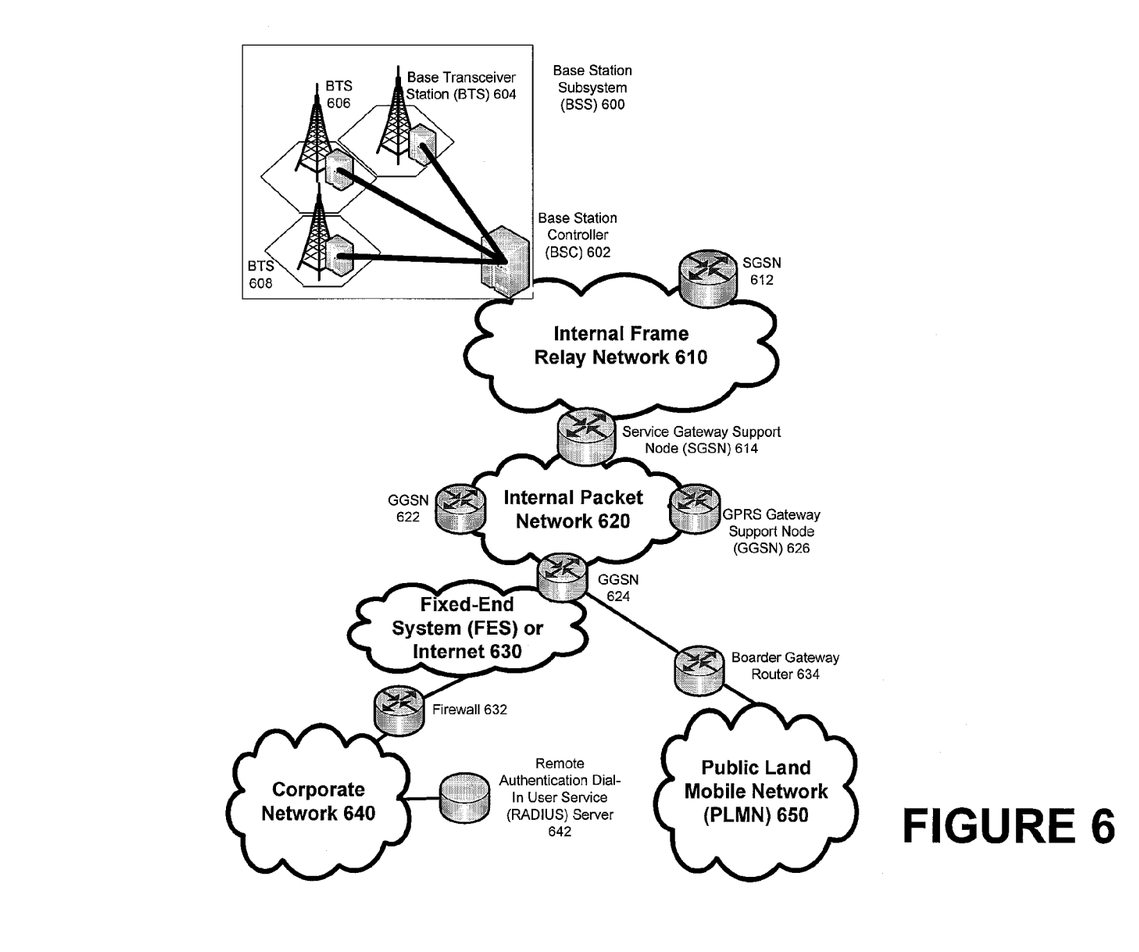
FIG. 6 depicts an overall block diagram of an exemplary packet-based mobile cellular network environment, such as a GPRS network, that may be used to control and access a security system.

FIG. 6 depicts an overall block diagram of an exemplary packet-based mobile cellular network environment, such as a GPRS network, that may be used to control and access a security system. In an example configuration, the emergency alert network 110 and/or the network 122 may be encompassed by the network environment depicted in FIG. 6. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., portable device 38) become connected to the wireless network. In exemplary fashion, the packet traffic originating from user devices (e.g., user device 60) is transported via an over-the-air interface to a BTS 608, and from the BTS 608 to the BSC 602. Base station subsystems, such as BSS 600, are a part of internal frame relay network 610 that may include Service GPRS Support Nodes ("SGSN") such as SGSN 612 and 614. Each SGSN is connected to an internal packet network 620 through which a SGSN 612, 614, etc. may route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via boarder gateway router 634. The Remote Authentication Dial-In User Service ("RADIUS") server 642 may be used for caller authentication when a user of a mobile cellular device calls corporate network 640.

Generally, there may be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 7:
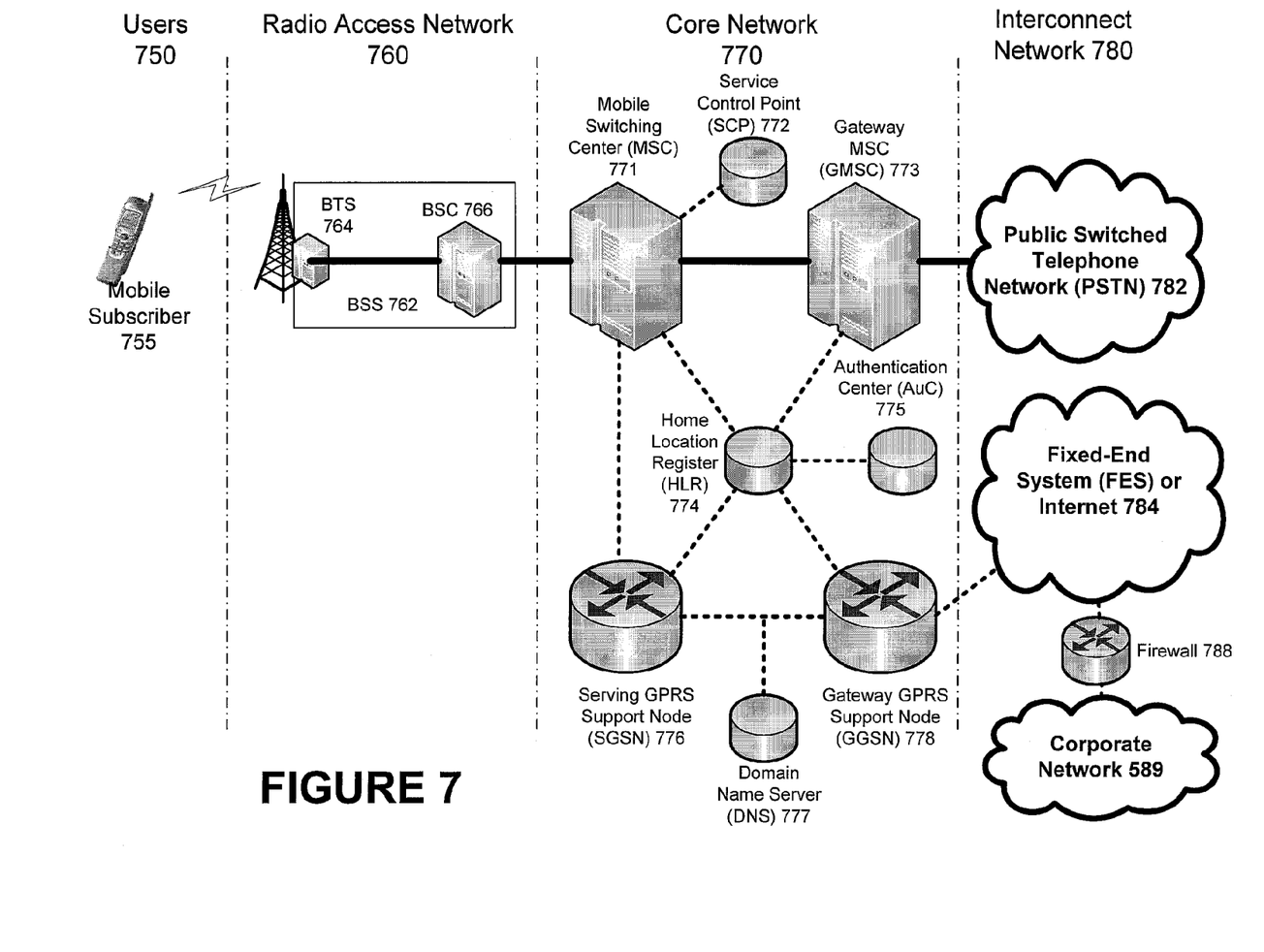
FIG. 7 illustrates an architecture of a typical GPRS network as segmented into four groups.

FIG. 7 illustrates an architecture of a typical GPRS network as segmented into four groups: users 750, radio access network 760, core network 770, and interconnect network 780. In an example configuration the emergency alert network 110, and the network 122 may be encompassed by the radio access network 760, core network 770, and interconnect network 780. Users 750 comprise a plurality of end users (though only mobile subscriber 755 is shown in FIG. 7). In an example embodiment, the device depicted as mobile subscriber 755 comprises portable device 38. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 6, interconnect network 780 comprises Public Switched Telephone Network ("PSTN") 782, Fixed-End System ("FES") or Internet 784, firewall 788, and Corporate Network 789.

A mobile switching center may be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the mobile device 114, used by an end user of the mobile cellular service. When a mobile subscriber turns on his or her mobile device, the mobile device goes through an attach process by which the mobile device attaches to an SGSN of the GPRS network. In FIG. 7, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which may be corporate network 789 in FIG. 6) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 may access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 may then go through radio access network 760, core network 770, and interconnect network 780, in a particular fixed-end system or Internet 784 and firewall 788, to reach corporate network 789.

Thus, network elements that may invoke the functionality of security system control and activation notification may include but are not limited to Gateway GPRS Support Node tables, Fixed End System router tables, firewall systems, VPN tunnels, and any number of other network elements as required by the particular digital network.

Figure 8:
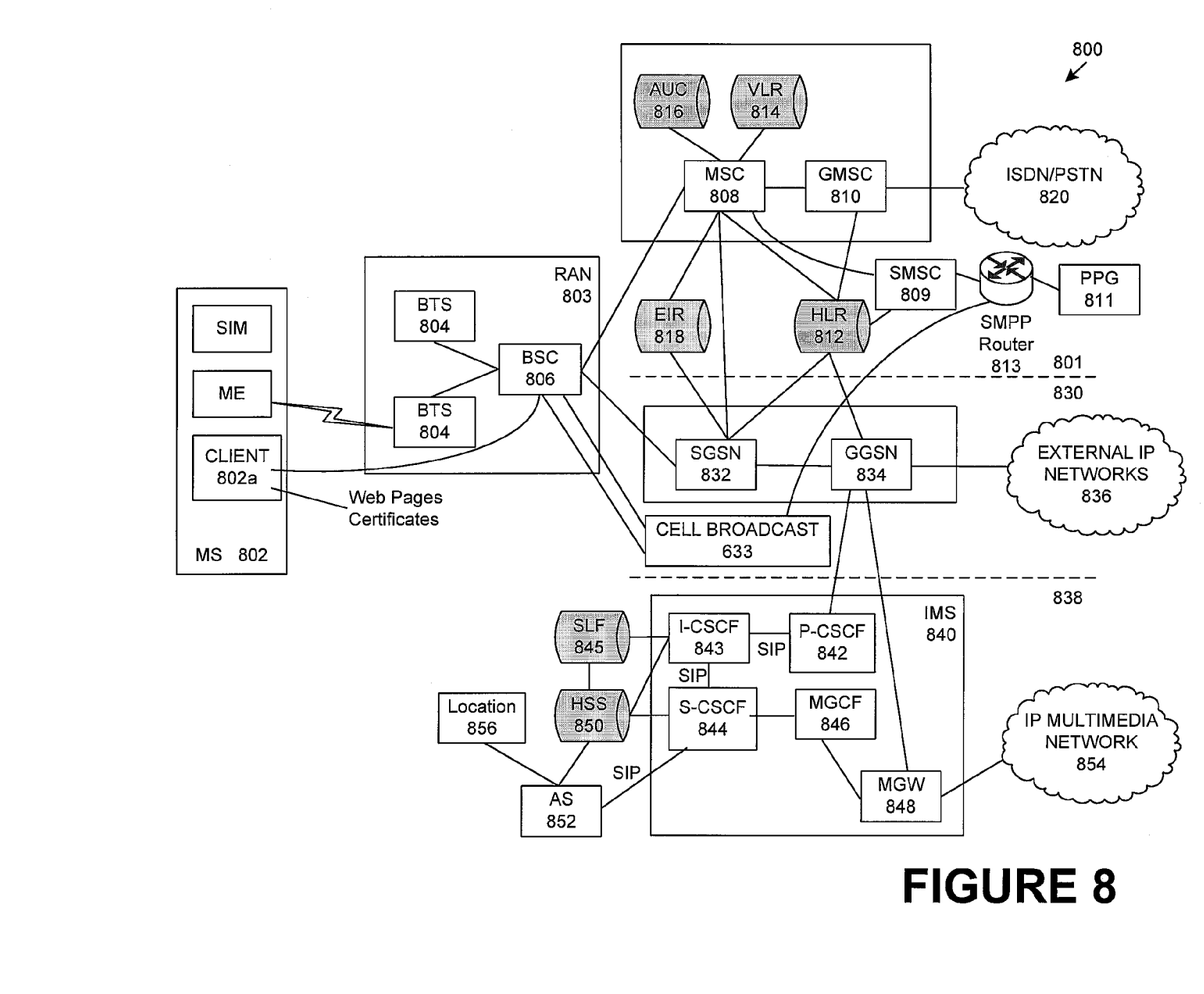
FIG. 8 illustrates an example alternate block diagram of an exemplary GSM/GPRS/IP multimedia network architecture that may be used to control and access a security system.

FIG. 8 illustrates another exemplary block diagram view of a GSM/GPRS/IP multimedia network architecture 800 that may be used to control and access a security system. As illustrated, architecture 800 of FIG. 8 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., portable device 38) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS also supports simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS may only use one of the two services at a given time.

A class C MS may attach for only one of the GPRS services and GSM services at a time. Simultaneous attachment and operation of GPRS services and GSM services is not possible with a class C MS.

A GPRS network 830 may be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS may monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of controlling a security system and providing notification of the security system being activated may be described in connection with various computing devices, the underlying concepts may be applied to any computing device or system capable of controlling a security system and providing notification of the security system being activated. The various techniques described herein may be implemented in connection with hardware or software or, where appropriate, with a combination of both. Thus, the methods and apparatus of controlling a security system and providing notification of the security system being activated, or certain aspects or portions thereof, may take the form of program code (i.e., instructions) embodied in tangible media, such as floppy diskettes, CD-ROMs, hard drives, or any other machine-readable storage medium, wherein, when the program code may be loaded into and executed by a machine, such as a computer, the machine may become an apparatus for controlling a security system and providing notification of the security system being activated. In the case of program code execution on programmable computers, the computing device may generally include a processor, a storage medium readable by the processor (including volatile and non-volatile memory and/or storage elements), at least one input device, and at least one output device. The program(s) may be implemented in assembly or machine language, if desired. In any case, the language may be a compiled or interpreted language, and combined with hardware implementations.

The methods and apparatus of controlling a security system and providing notification of the security system being activated also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine may become an apparatus for controlling a security system and providing notification of the security system being activated. When implemented on a general-purpose processor, the program code may combine with the processor to provide a unique apparatus that operates to invoke the functionality of controlling a security system and providing notification of the security system being activated. Additionally, any storage techniques used in connection with controlling a security system and providing notification of the security system being activated may invariably be a combination of hardware and software.

While controlling a security system and providing notification of the security system being activated may have been described in connection with the various embodiments of the various figures, it is to be understood that other similar embodiments may be used or modifications and additions may be made to the described embodiment for performing the same functions described herein. For example, one skilled in the art will recognize that a system of controlling a security system and providing notification of the security system being activated as described may apply to any environment, whether wired or wireless, and may be applied to any number of devices connected via a communications network and interacting across the network.

What is claimed is:

1. A system comprising:
   a communication network entity; and
   memory coupled to the communication network entity, the memory having instructions stored thereon that when executed by the communication network entity cause the communication network entity to effectuate operations comprising:
   receiving an indication of a security system of a building;
   determining an activation interface based on the indication, wherein the activation interface comprises a plurality of activation options, and the activation interface and is determined from one of a plurality of interfaces associated with the security system;
   determining an alarm type and a zone of the building, the alarm type and the zone being associated with the indication;
   providing the activation interface comprising activation information and zone information that corresponds to the alarm type and the zone;
   receiving a selection of an activation option of the plurality of activation options that corresponds to a view zone option or a dispatch option;
   responsive to the selection of the activation option corresponding to the view zone option, rendering a zone interface comprising a floor plan of the building, the floor plan comprising a highlighted zone that corresponds to the zone that is associated with the indication; and
   responsive to the selection of the activation option corresponding to the dispatch option, providing a dispatch indication to a protection entity.

2. The system of claim 1, the operations further comprising:
   determining whether the activation option corresponds to a control indication associated with the security system; and
   providing the control indication to the security system if, based on the determination, the activation option corresponds to the control indication.

3. The system of claim 1, wherein the zone interface comprises real-time video information associated with the zone.

4. A mobile device comprising:
   a communication component, wherein the communication component provides communication between the mobile device and a security system of a building;
   an interface component configured to render a plurality of interfaces, each one of the
   plurality of interfaces being associated with the security system;
   a processor; and
   memory coupled to the processor, the memory having executable instructions stored thereon that when executed by the processor cause the processor to effectuate operations comprising:
   receiving, via the communication component, an indication from the security system;
   determining an activation interface based on the indication, wherein the activation interface comprises a plurality of activation options, and the activation interface and is determined from one of a plurality of interfaces associated with the security system;
   determining an alarm type and a zone of the building, the alarm type and zone being associated with the indication;
   receiving a selection of an activation option of the plurality of activation options that corresponds to a view zone option or a dispatch option;
   responsive to the selection of the activation option corresponding to the view zone option, rendering, via the interface component, a zone interface comprising a floor plan of the building, the floor plan comprising a highlighted zone that corresponds to the zone that is associated with the indication;
   responsive to the selection of the activation option corresponding to the dispatch option, providing a dispatch indication to a protection entity; and
   outputting, via the interface component, the activation interface wherein the activation interface further comprises:
   the indication, wherein the indication comprises alarm information corresponding to the alarm type and zone information corresponding to the zone;
   selectable access to a panel interface configured to control the security system; and
   selectable access to a view of the zone.

5. A method comprising:
   receiving an indication of a security system of a building;
   determining an activation interface based on the indication, wherein the activation interface comprises a plurality of activation options, and the activation interface is determined from one of a plurality of interfaces associated with the security system;
   determining an alarm type and a zone of the building, the alarm type and the zone being associated with the indication;

providing the activation interface comprising activation information and zone information that corresponds to the alarm type and the zone;

receiving, by the device, the activation interface associated with a security system of a building;

determining, by the device, a panel interface for communicating with the security system based on the activation interface, wherein the panel interface is one of a plurality of interfaces associated with the security system;

rendering, by the device and based on the determination, the panel interface that corresponds to the activation interface, wherein the panel interface comprises a panel option;

receiving, by the device, a selection of the panel option;

providing, by the device, the selection of the panel option to the security system determining, by the security system, whether the selection of the panel option corresponds to a view zone option or a dispatch option;

rendering a zone interface comprising a floor plan of the building in response to the selection of the panel option corresponding to the view zone option; and providing a dispatch indication to a protection entity in response to the selection of the panel option corresponding to the dispatch option.

6. The method of claim 5, wherein the panel interface corresponds to a control interface associated with the security system.

7. The method of claim 5, wherein the panel interface comprises at least one of the following: a web page, a java interface, a flash interface, or an application interface.

8. The method of claim 5, wherein the panel option comprises at least one of the following: an activation option to activate the security system or a deactivation option to deactivate the security system.

9. The method of claim 5, wherein providing the selection of the panel option to the security system comprises determining a control indication corresponding to the selection of the panel option, wherein the control indication is provided to the security system to cause the security system to perform the function associated with the selection of the panel option.

10. The method of claim 5, wherein the identifier comprises at least one of the following: a model number and a serial number.

11. The method of claim 5, wherein the method is executed by a processor via a mobile device.

* * * * *